No. 803,478. PATENTED OCT. 31, 1905.
H. H. FREUND.
FERMENTING APPARATUS.
APPLICATION FILED FEB. 6, 1904.
3 SHEETS—SHEET 1.
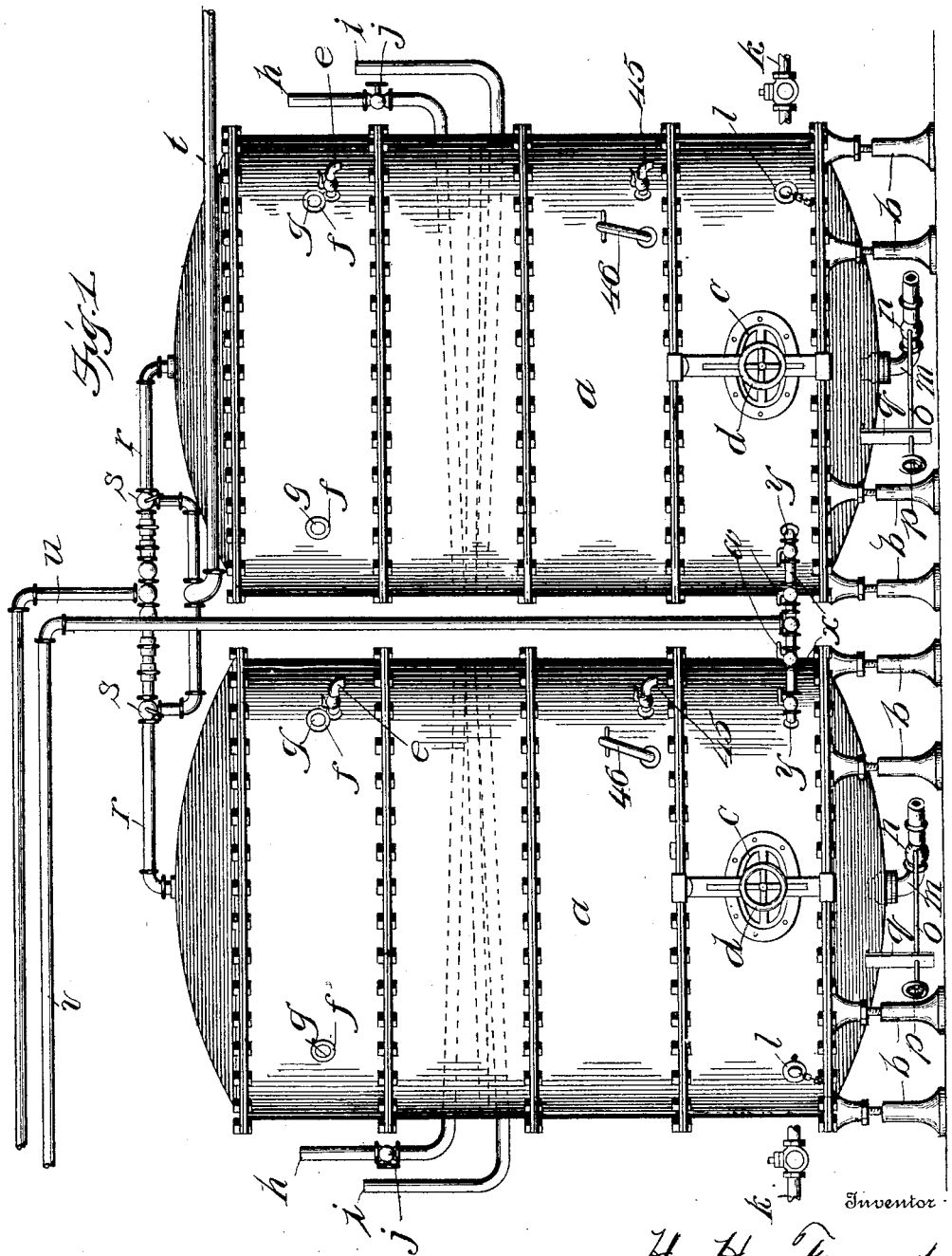
Witnesses
J. F. Pattison
Geo. H. Bynne
Inventor
H. H. Freund
By Wilkinson & Fisher
Attorneys

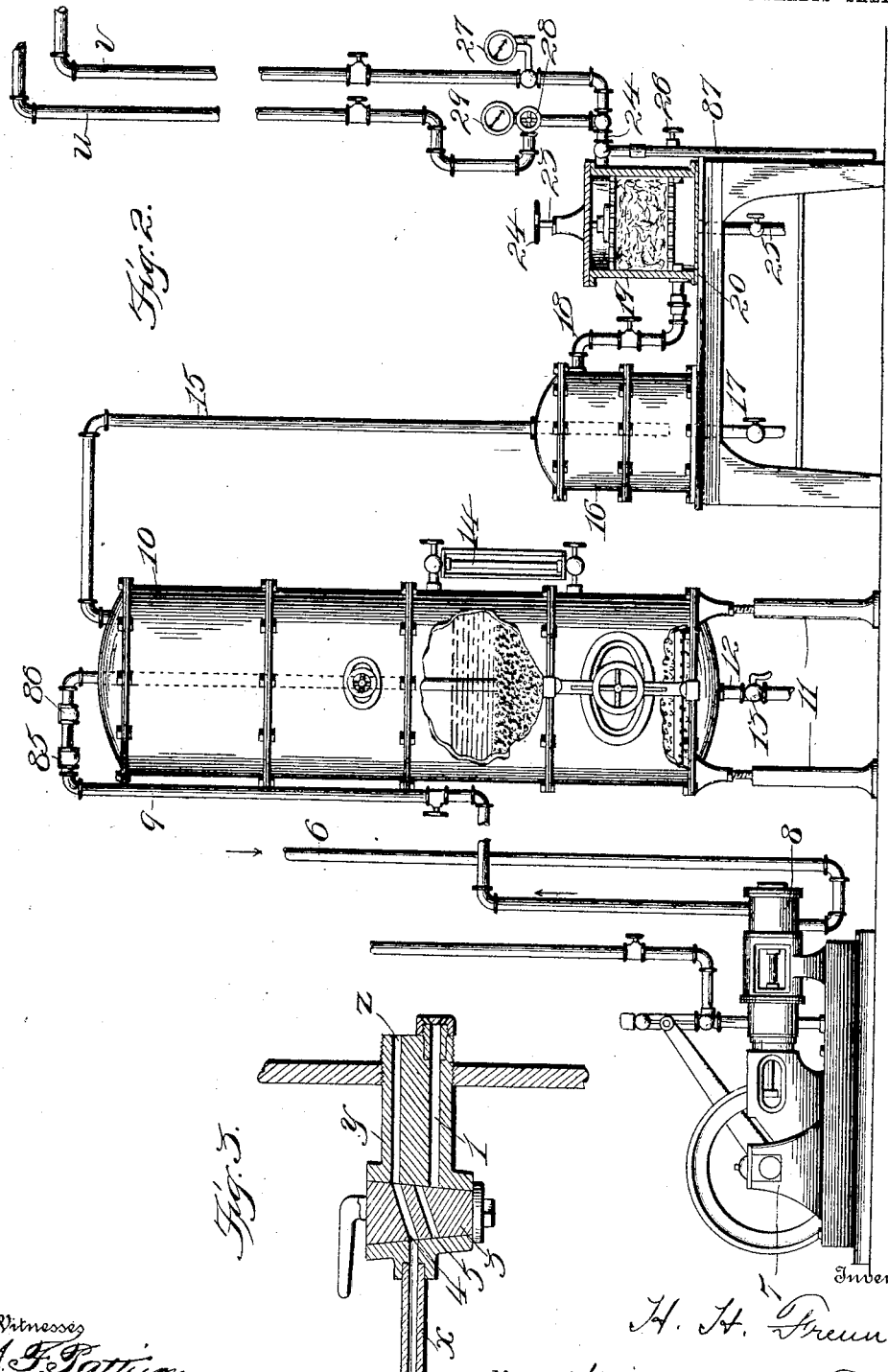

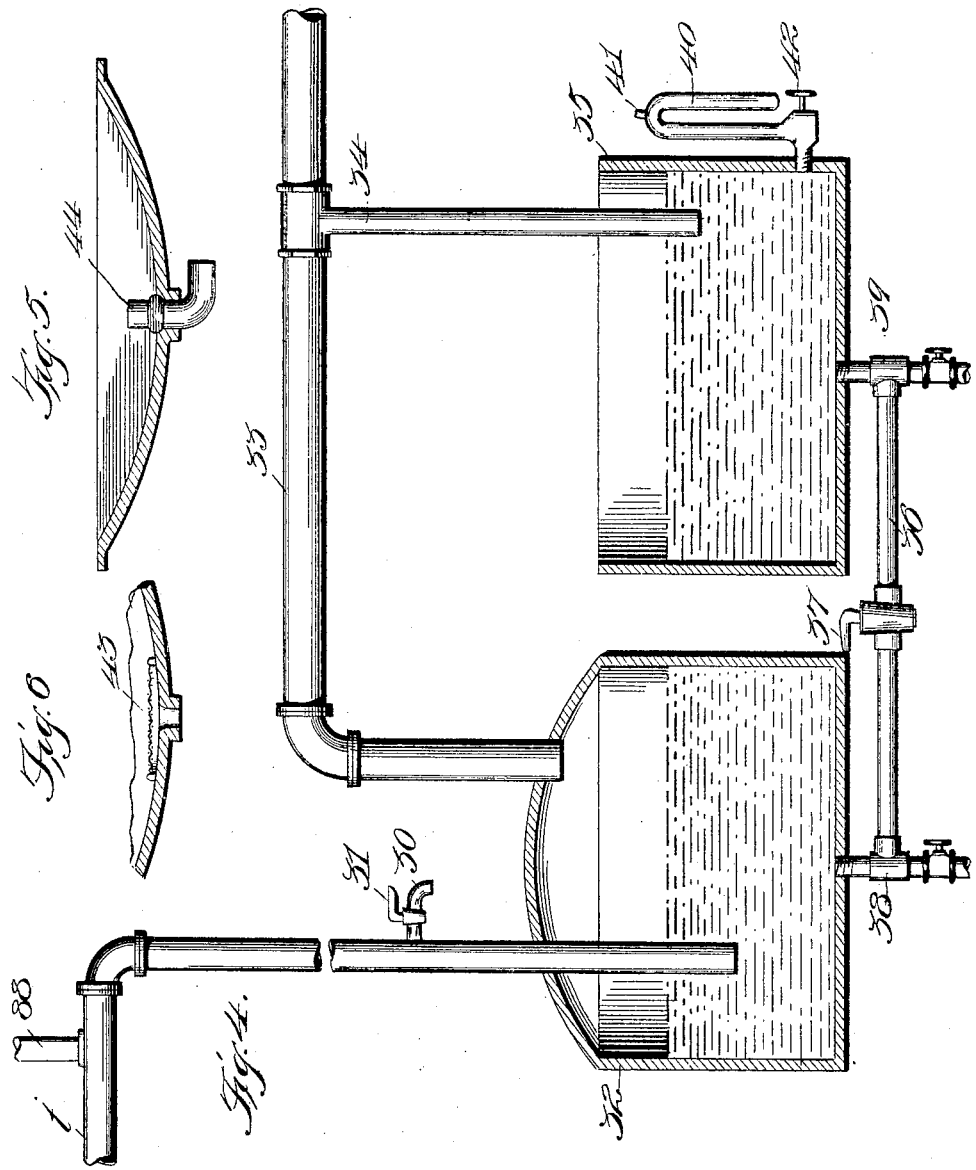

UNITED STATES PATENT OFFICE.

HANS H. FREUND, OF NEW YORK, N. Y.

FERMENTING APPARATUS.

No. 803,478.    Specification of Letters Patent.    Patented Oct. 31, 1905.

Application filed February 6, 1904. Serial No. 192,396.

*To all whom it may concern:*

Be it known that I, HANS H. FREUND, a citizen of the United States, residing at New York, in the county of New York and State of New York, have invented certain new and useful Improvements in Apparatus Used for Fermenting Beer, Ale, and Other Fermentable Liquids; and I do hereby declare the following to be a full, clear, and exact description of the invention, such as will enable others skilled in the art to which it appertains to make and use the same.

My invention relates to an improvement in apparatus used for fermenting beer, ale, and other fermentable liquids, which apparatus is fully described and illustrated in the following specification and drawings, the novel features thereof being specified in the annexed claims.

In the accompanying drawings, Figure 1 represents the fermenting-vats and their connections. Fig. 2 represents the apparatus for supplying sterilized air. Fig. 3 is a sectional view representing the jets for aerating the liquid to be fermented. Fig. 4 represents the liquid seal. Figs. 5 and 6 show modified forms in section of the lower parts of one of the fermenting-tanks.

During the fermentation no outside air is allowed to come in contact with the liquid. The tanks are kept closed, and nothing but sterilized and filtered air is allowed to touch the liquid. After each lot of beer has been fermented the tank is thoroughly washed and disinfected before another lot of wort is pumped into the tank.

In the drawings, $a$ represents the enamel-lined steel tanks. These are supported on the jack-screw supports $b$, so that the tanks may be exactly leveled. Each of the tanks is provided with a manhole having the usual cover $c$ fastened by the usual means $d$.

$e$ represents an overflow-cock, which is used for the purpose of testing the beer and for determining the height of the beer in the fermenting-casks.

$f$ represents openings about three inches in diameter, which are located a short distance, about one and one-half inches, higher than the overflow-cock. These openings are closed by removable bushes $g$ until nearly the close of the fermenting process.

$h$ and $i$ represent the inlet and outlet ends of a pipe which is coiled within the tank, as shown in dotted lines in Fig. 1, for the purpose of circulating a cooling liquid therein to cool the beer when the temperature rises during the process of fermentation.

$j$ represents a cock in the valve $h$ for the purpose of regulating the flow.

Each tank $a$ is provided with a spring-valve, which is ordinarily covered by a cap $l$, attached to the tank, as shown. The wort is pumped through a valved pipe $k$ into one of the tanks $a$ by means of a hose connection between said pipe $k$ and the spring-valve.

$m$ represents a discharge-pipe for the beer, located at the bottom of the tank. The discharge pipe or elbow is provided with a valve $n$, mounted on a rod $o$, which is operated by a hand-wheel $p$, which is supported in the bracket $q$, attached to the tanks $a$, this being for convenience of reaching the same from the outside. The beer is racked off, after the fermentation is finished, through the pipe $m$, to which a hose is attached in the usual way.

To the top of each tank is attached a pipe $r$, which serves the double purpose of allowing the carbonic-acid gas to escape through the preliminary stages of fermentation and allowing sterilized and filtered air to be pumped into the top of the tank near the close of the fermentation. I have shown this pipe $r$ as entering the tank $a$ centrally of its top; but of course it might enter at any desired point. The pipe $r$ is provided with a three-way cock $s$, of which there is one for each tank, this cock being adapted to be turned so as to discharge the mixed air and gas directly into the atmosphere during the beginning of the fermentation or to discharge gas into the pipe $t$, which leads the gas either to a liquefying apparatus or outside of the building. By turning the cock $s$ still farther air is admitted through the air-pipe $u$, which is connected to the air-compressing apparatus.

$v$ represents another pipe connected to the air-compressing apparatus, and this pipe is removably connected with the base of each of the fermentation-tanks by means of an elbow provided with a valve $w$, a short rubber hose $x$, and a faucet $y$, permanently fixed in the wall of the tank $a$. This faucet $y$ is shown in detail in Fig. 3 and is of the form shown in the patent to Wallerstein and Freund, No. 692,170, dated January 28, 1902. This faucet is provided with two passages, one of them, $z$, being for the coarse or strong aeration and the other, 1, being for the fine aeration. The passage 1 is closed on the inside of the tank $a$ by a plate 2, provided with two fine openings. The faucet is provided with a plug 3 with two passages 4 and 5 therein. By turning the plug the air is directed from the pipe $x$ into either of the passages $z$ or 1 at will.

In Fig. 2 is shown the means for cooling, sterilizing, and filtering the air. The air is preferably taken from outside the building, coming in through the pipe 6 by an air-compressor 7, provided with a water-jacket 8, to cool the same, and the air then passes through the valved pipe 9 into the sterilizing apparatus 10, which consists of a tank mounted on jack-screws 11 and provided with a drip-pipe 12, having a cock 13. The tank is in practice about one hundred and twenty inches by thirty-six inches, fitted with suitable cocks, gages, manholes, &c.

14 represents the gage to show the height of the liquid. The tank is filled to a depth of about forty-five inches with gravel and to about fifty-five inches with a solution of permanganate of potash. In the pipe 9 are the check-valves 85 and 86, which prevent the chemically-charged liquid from flowing back into the pump in case the operation of pump is suspended for any reason. Two check-valves are used to insure positive results.

Of course any other sterilizing solution might be used. The pipe 9 runs nearly to the bottom of the tank 10, terminating in a perforated cross-pipe. The air comes out of the tank 10 through the pipe 15, whence it passes into a drip-tank 16, which is provided with valved escape-pipe 17, from whence the air passes through the valved pipe 18 into the filter 19, composed of a casing and of sterilized cotton held in position between the two parallel perforated plates 20 and 21. The lower plate 20 is supported on a ledge 22, and the upper plate 21 is adjustable back and forth by means of a screw 23, provided with a handwheel.

25 is a valved drip-pipe connected to the filter 19. From the filter 19 the air passes into the delivery-pipe 24, which is provided with a branch pipe 87, having a cock 26 for connecting with the chip-casks for the purpose of racking off beer under pressure with sterilized and filtered air.

The pipe 24 is connected to the pipes $u$ and $v$, already described. The pipe $v$ receives the full pressure of the air, which pressure is indicated by the gage 27. The pipe $u$ is provided with a reducing-valve 28, and the gage 29 shows the pressure in said pipe $u$. In practice the pressure in the pipe $v$ should be about twenty pounds and the pressure in the pipe $u$ about four pounds.

To prevent the carbonic-acid gas from pressing backward into any one of the tanks, I use the liquid seal. (Shown in Fig. 4.) The pipe $t$, which conveys away the carbonic-acid gas, is provided with a small pipe 30, having a cock 31, by means of which the gas in the pipe $t$ may be tested to see if it is pure. The pipe $t$ passes down through the closed top of a vessel 32, dipping about five inches below the surface of the water which is contained in said vessel. After bubbling through the water the gas passes out through the pipe 33 either out of the building or to the liquefying apparatus. Connected to the pipe 33 is a branch 34, which dips down about three inches into water contained in the open-top vessel 35. By this construction it will be seen that should any considerable amount of back pressure be generated the gas will escape through the pipe 34 and through the open top of the vessel 35 along the line of least resistance. The water is maintained at the same level in the vessels 32 and 35 by means of a pipe 36, provided with a cock 37, which pipe enters T's 38 and 39, screwed into the bottoms of the vessels 32 and 35. These T's have valved drain-pipes connected with them. Usually water is supplied to the vessel 35 through a hose passing into said vessel through its open top.

40 represents a bent pipe connected to the vessel 35 for the purpose of preventing the water in said vessel from rising above the proper level. This pipe 40 is provided with a small hole 41 to break the water seal and with a hand-wheel 42 for operating the valve in said pipe.

To prevent the yeast passing out with the beer when the latter is racked off, I have shown means in Figs. 5 and 6. In Fig. 6 a removable screen 43 is located over the discharge-orifice, and in Fig. 5 a removable boss 44 is fitted into the end of the discharge-pipe, the boss rising above the bottom thereof some little distance, the yeast settling around said boss 44.

45 represents a test-cock, and 46 a thermometer.

If a starting-tank is used, the wort remains therein for about twenty to twenty-four hours and is subjected to a strong aeration by the means of the air at a pressure of about twenty pounds, which is blown in through the opening $z$ in the faucet $y$. The purpose of this aeration is to thoroughly mix up the wort, although as an incident the aeration supplies oxygen to the wort, which aids in the fermentation. This strong aeration is used intermittently for a minute or two once every three or four hours during the first stage of the fermentation, at the end of which time a white foam forms on the top of the wort, showing that fermentation has set in and that the yeast has begun to sprout, the dead yeast-cells and albuminoids falling to the bottom. The wort is then allowed to settle for about two hours and is then pumped into one of the glass-enameled lined steel tanks $a$, the corresponding three-way cock being turned so as to let the air in the tank escape and the overflow-cock $e$ being also opened. The normal temperature of the cellar should be about $5\frac{1}{2}°$ Réaumur. If, however, the temperature of the cellar is lower—that is to say, about 3° or 4° Réaumur—the temperature of the wort should be higher—about 6° Réaumur.

Some brewers use starting-tanks in fermentation in order to get rid of the hop-resins and albuminoids before the main fermentation begins. Therefore a starting-tank may be used; but it is not necessary, however, and, indeed, I prefer to conduct the entire fermentation in the closed steel tanks $a$.

In case a starting-tank is not used the preliminary operation in one of the tanks $a$ is the same as that already described—that is to say, the wort is strongly aerated by air passing in through the pipe $v$ and through the opening $z$ of the faucet $y$ at intervals of every three hours until the layer of white foam appears on top of the beer.

In pumping the wort into the tank $a$ the wort enters said tank through the pipe $k$, the overflow-cock $e$ being open. When the wort begins to run out of the cock the pumping is stopped and the cock closed, the wort then being just below the openings $f$, which are closed by the bushings $g$. After the strong aeration, whether this is conducted in a starting-tank or tank $a$, the wort is subjected to a fine aeration, (the cock 3 being turned so that the air passes in through the pipe $v$ through the opening 1 into the tank $a$.) This fine aeration is continued for six or eight hours steadily. No fixed rule, however, can be laid down as to the exact quantity of air to be used. This depends upon many factors—the quality of the wort, the quality of the beer desired, and the quality of the yeast—and must to a certain extent be left to the judgment of the brewer in each case.

Usually six to eight hours of fine aeration is sufficient, although it may be employed longer, if found necessary. After the fine aeration is stopped the air and gas soon begin to flow out of the three-way cock $s$, and the gas coming out is tested. The carbonic-acid gas being the heavier, the air, speaking generally, will come out first, although of course it will be mixed with a little carbonic-acid gas. As soon as the test shows that the escaping gas shows ninety-nine per cent. or more of carbonic-acid gas the three-way cock $s$ is turned so as to direct the gas into the pipe $t$, through which it is conducted away for the purpose of carbonating beer already fermented or for liquefaction or to be thrown away, as desired. The fermentation is then allowed to continue for five or six days, and the temperature gradually rises. When the temperature reaches $8\frac{1}{2}°$ or 9° Réaumur, as will be indicated by the thermometer on tank $a$, the cooling liquid in the attemperator is turned on, and the beer is kept at this temperature until the wort shows a good break—that is to say, when the yeast shows a flaky appearance. This may be found out by drawing out small samples of beer through any one of the cocks in tank and testing it. The saccharimeter indications should be taken every day, and when this indication shows one per cent. higher than what is desired over the final fermentation the liquid is subjected to the final step, which consists in removing the bushes $g$, which allows the carbonic-acid gas to flow out of the openings $f$ by its own weight and replacing the carbonic-acid gas by air through the pipes $u$ and $r$. In other words, if it is desired to ferment from twelve per cent. down to four per cent., as shown by the saccharimeter, this final step should be taken when the saccharimeter indicates anywhere from four and three-fourths to five per cent.

To insure a proper clarification of the beer, it is indispensable that the last stages of fermentation proceed without any layer of carbonic-acid gas above the beer, and according to my process it is also indispensable that as this carbonic-acid gas flows out by its own weight no impure cellar-air should be allowed to enter, and this is effected by causing a gentle stream of sterilized air to flow in through the pipes $u$ and $r$. After the beer is well broken its temperature is carried down as low as possible—say to about 3° Réaumur—which usually takes not longer than twenty-four hours, so that the whole fermentation, including the cooling, takes place in a single tank and within seven or eight days.

When the fermentation is completed, the beer is racked off through the elbow $m$, through a racking-pipe, to a chip-cask and there finished in the usual way. The yeast is prevented from running out of the bottom by means of the devices shown in Figs. 5 and 6, although any sort of a straining device may be used. After the tank is emptied the screen 43 or the boss 44 is removed and the yeast is washed out through the racking-pipe into a yeast back or receptacle. The yeast after being cleansed is used in subsequent fermentation.

After the yeast has been drawn out the tank and the racking-pipe are thoroughly washed and cleansed.

Referring to Fig. 4, a quarter-inch pipe 88 is connected to the pipe $t$, and this pipe 88 is extended to the office and is connected to a siphon pressure-gage, which also is regulated in accordance with the pressure that should be carried on the carbonic-acid-gas line and which is always under the supervision of the brew-master or the brewer. To this gage is also attached a small cock, from which the gas may be taken for testing.

Having thus described my invention, what I claim as new, and desire to secure by Letters Patent, is—

1. In a fermenting apparatus, the combination with the fermenting-tank, an air-compressor, air filtering and sterilizing apparatus, pipes connecting said apparatus with said tank near the top and bottom thereof respectively, a pressure-reducing valve in the pipe connected to the tank near its top, a pipe for conveying away the carbonic-acid gas generated by the fermentation, said pipe being connected to said last-named air-pipe, and a three-way cock in said connection whereby communication may be established between the unfilled portion in the top of the tank and the atmosphere or the air-pipe or the pipe for conveying away the carbonic-acid gas, substantially as described.

2. In a fermenting apparatus, the combination of the fermenting-tank provided with an overflow-cock, means for supporting and leveling said tank, said tank being provided with closable openings located immediately above said overflow-cock, an air-compressor, air sterilizing and filtering apparatus, two lines of pipe connecting said apparatus with said tank near the top and bottom thereof respectively, a pipe for the discharge of carbonic-acid gas connected to the air-pipe which enters said tank near its top, a three-way cock located in the connection between said gas-pipe and said air-pipe, and means located in the air-pipe connected to said tank near its bottom for directing a large stream of air, or a plurality of fine streams of air into said tank near its bottom, substantially as described.

3. In a fermenting apparatus, the combination of the fermenting-tank provided with an overflow-cock, and with closable openings located at a slightly higher level than said overflow-cock, means for supporting and leveling said tank, means for delivering liquid into said tank, means for discharging the liquid therefrom, means for retaining the yeast and solid matters in said tank, an air-compressor, an air sterilizing and filtering apparatus, air-pipes connecting said apparatus with said tank, and entering said tank near the top and bottom thereof respectively, a gas-escape pipe connected to the former of said air-pipes, a three-way cock in the connection between said pipes, and means for preventing the gas from returning from said gas-escape pipe back into said tank, substantially as described.

4. In a fermenting apparatus, the combination of the fermenting-tank, provided with an overflow-cock and with closable openings located in a plane just above said overflow-cock, an air-compressor, an air-sterilizer, an adjustable air-filter, pipes connecting said air-filter with said tank near the top and bottom thereof respectively, means for reducing the air-pressure in the pipe connected to said tank near its top, and a three-way cock located in said last-named pipe near the tank, substantially as described.

5. In a fermenting apparatus, the combination of a tank provided with an overflow-cock near its top, a testing-cock lower down, a thermometer, and a row of closable openings located in a plane just above said overflow-cock, means for delivering the liquid to be fermented into said tank, means for drawing off the liquid from said tank, means for retaining the solid matters in said tank, means for cooling the liquid in said tank, an air-compressor, an air-sterilizer, a drip-tank, a compressible air-filter, air-pipes leading from said filter to said tank and connected therewith near the top and bottom thereof respectively, a faucet in the air-pipe connected to said tank near its bottom, said faucet being arranged to deliver a large stream of air or a number of fine streams of air into said tank, a gas-escape pipe connected to the air-pipe which enters said tank near its top, a three-way cock located in the connection between said gas-escape pipe and air-pipe, and a liquid seal for preventing the return of the gas through said gas-escape pipe back into said tank, substantially as described.

In testimony whereof I affix my signature in presence of two witnesses.

HANS H. FREUND.

Witnesses:
R. JULIUS MUNZ,
H. A. SCHALK.